United States Patent [19]

Bulgrien et al.

[11] Patent Number: 5,450,768
[45] Date of Patent: Sep. 19, 1995

[54] CLUTCH ENGAGEMENT MODULATION TO CONTROL ACCELERATION

[75] Inventors: Garth H. Bulgrien, Ephrata; Bradley A. Nielsen, Denver, both of Pa.

[73] Assignee: New Holland North America, Inc., New Holland, Pa.

[21] Appl. No.: 209,914

[22] Filed: Mar. 14, 1994

[51] Int. Cl.⁶ .............................................. F16H 61/00
[52] U.S. Cl. ................................. 74/336 R; 192/3.58; 192/103 C
[58] Field of Search ............................ 74/336 R, 335; 192/103 C, 3.58, 87.11, 3.62, 109 F

[56] References Cited

U.S. PATENT DOCUMENTS

| | | | |
|---|---|---|---|
| 5,035,308 | 7/1991 | Baba et al. | 192/3.58 |
| 5,062,050 | 10/1991 | Petzold et al. | 192/3.58 |
| 5,097,726 | 3/1992 | Asada | 74/336 R |
| 5,101,688 | 4/1992 | Pearce et al. | 192/3.58 |
| 5,333,709 | 8/1994 | Bulgrien | 74/335 |

Primary Examiner—Charles A. Marmor
Assistant Examiner—Peter Kwon
Attorney, Agent, or Firm—Griffin, Butler, Whisenhunt & Kurtossy

[57] ABSTRACT

In a tractor transmission system having electro-hydraulically actuated powershift clutches and a forward/reverse coupler mechanically coupled to a forward/reverse lever, a dump button is provided on the lever for releasing powershift clutch pressure. The forward/reverse coupler is uncoupled from the transmission input and output shafts when the button is depressed. An operator may shift between forward and reverse gears by depressing the button and shifting the lever. Upon release of the dump button, a microprocessor performs a control algorithm during which it senses engine speed and ground speed, computes acceleration/deceleration, and controls the clutch pressure of one of the powershift clutches to provide smooth acceleration in the direction selected by the shift lever. The arrangement is particularly suited for shuttle shift (forward/reverse) operations but may be used to provide smooth acceleration from a stopped position. Smooth acceleration is obtained regardless of the tractor weight and load and operation of a clutch pedal is not required. The control algorithm is equally suitable for controlling full powershift transmissions or synchronized shuttle transmissions having no powershift clutches.

17 Claims, 7 Drawing Sheets

Pressure vs. Time
TYPICAL DEFAULT MODULATION CURVE

CLUTCH ENGAGEMENT MODULATION TO CONTROL ACCELERATION

FIELD OF THE INVENTION

This invention relates to an improvement in transmission systems for tractors and other off-road vehicles. More particularly, the invention provides a method and apparatus providing more uniform shifting or starts from rest regardless of tractor weight or drawbar load.

BACKGROUND OF THE INVENTION

Pearce et al. U.S. Pat. No. 5,101,688 discloses a transmission system for an agricultural tractor. In a system of the type disclosed in the patent it has been conventional to employ a fixed pressure-versus-time relationship in controlling the clutches during shifting. During shuttle shifting operations, that is, shifts between forward and reverse gears, this results in significant variations in acceleration depending on the weight of the tractor in which the transmission is installed, and the load the tractor is pulling or pushing. For automatic clutch engagement when starting from rest, a compromise pressure versus time relationship must be used to prevent excessive clutch slippage under high load conditions, yet provide a reasonably smooth start-up with no load.

SUMMARY OF THE INVENTION

An object of the present invention is to provide a method and apparatus for controlling transmission shifting to provide more uniform acceleration regardless of the load on the transmission.

Another object of the invention is to provide a method and apparatus for automatically controlling transmission clutch pressure during shifting, the clutch pressure being controlled in accordance with the rate of output speed acceleration.

A further object of the invention is to provide a method and apparatus for automatically controlling a transmission clutch by sensing the rate of speed of the transmission output shaft, calculating the actual acceleration, and controlling the clutch pressure in accordance with the actual acceleration to obtain a target acceleration. Generally speaking, the acceleration is controlled by increasing clutch pressure when the actual acceleration is below the target acceleration.

Yet another object of the invention is to provide a transmission system having a forward/reverse coupler, a plurality of electro-hydraulic powershift clutches for selectively connecting an input shaft through gearing to an output shaft, and a forward/reverse shift lever mechanically linked to the forward/reverse coupler, the transmission system further comprising a dump switch, a dump button located on the forward/reverse shift lever for actuating the dump switch when the dump button is depressed and a controller responsive to actuation of the dump switch for disengaging the powershift clutches to disconnect the input and output shafts from the coupler.

Still another object of the invention is to provide a transmission system as described above for a tractor and further including a speed sensor for sensing the ground speed of the tractor, the controller including means responsive to the speed sensor for determining the acceleration of the tractor, and means for controlling pressure to at least one of the powershift clutches to vary the clutch pressure when the dump button is released, the pressure being varied dependent on the acceleration of the tractor and the elapsed time since the dump button was released.

A further object of the invention is to provide a transmission system including a transmission having a forward/reverse coupler and electro-hydraulic powershift clutches for selectively connecting an input shaft to an output shaft at a selected gear speed ratio, a shift lever mechanically connected to the forward reverse coupler, a dump button on the shift lever, a sensor for sensing the rate of rotation of the output shaft, and a programmable controller responsive to the sensor and the dump button for controlling clutch pressure in one of the powershift clutches. The controller responds to pressing of the dump button by releasing pressure to the powershift clutches. When the dump button is released the controller controls the increase of pressure in the one powershift clutch. The controller calculates acceleration/deceleration from the sensed rate of rotation of the output shaft. The controller includes a table of pressure values stored in a non-volatile memory and a counter for addressing the table. As the count in the counter increases, the values read from the table cause increased pressure in the one powershift clutch. The counter is incremented by 0, 1 or 2 depending on various factors or conditions such as the elapsed time since the dump button was released, the elapsed time since the acceleration/deceleration exceeded a threshold value, changes in ground speed, failure of the output shaft sensor, and acceleration greater than the threshold value when the measured output shaft speed is already greater than the normal shaft speed for a given input shaft speed and selected gear ratio.

Another object of the invention is to provide a novel method and apparatus for controlling acceleration of a vehicle during shuttle shifting and starts from rest by releasing clutch pressure in a feathering clutch which controls the transfer of torque between an input shaft and an output shaft of a transmission, terminating the release of clutch pressure in the feathering clutch, measuring the acceleration of the vehicle after the release of clutch pressure has been terminated, and increasing the feathering clutch pressure in accordance with the acceleration.

Other objects of the invention and the method of making and using it will become obvious from the following description and the accompanying drawings.

DESCRIPTION OF THE INVENTION

Figure 1A:
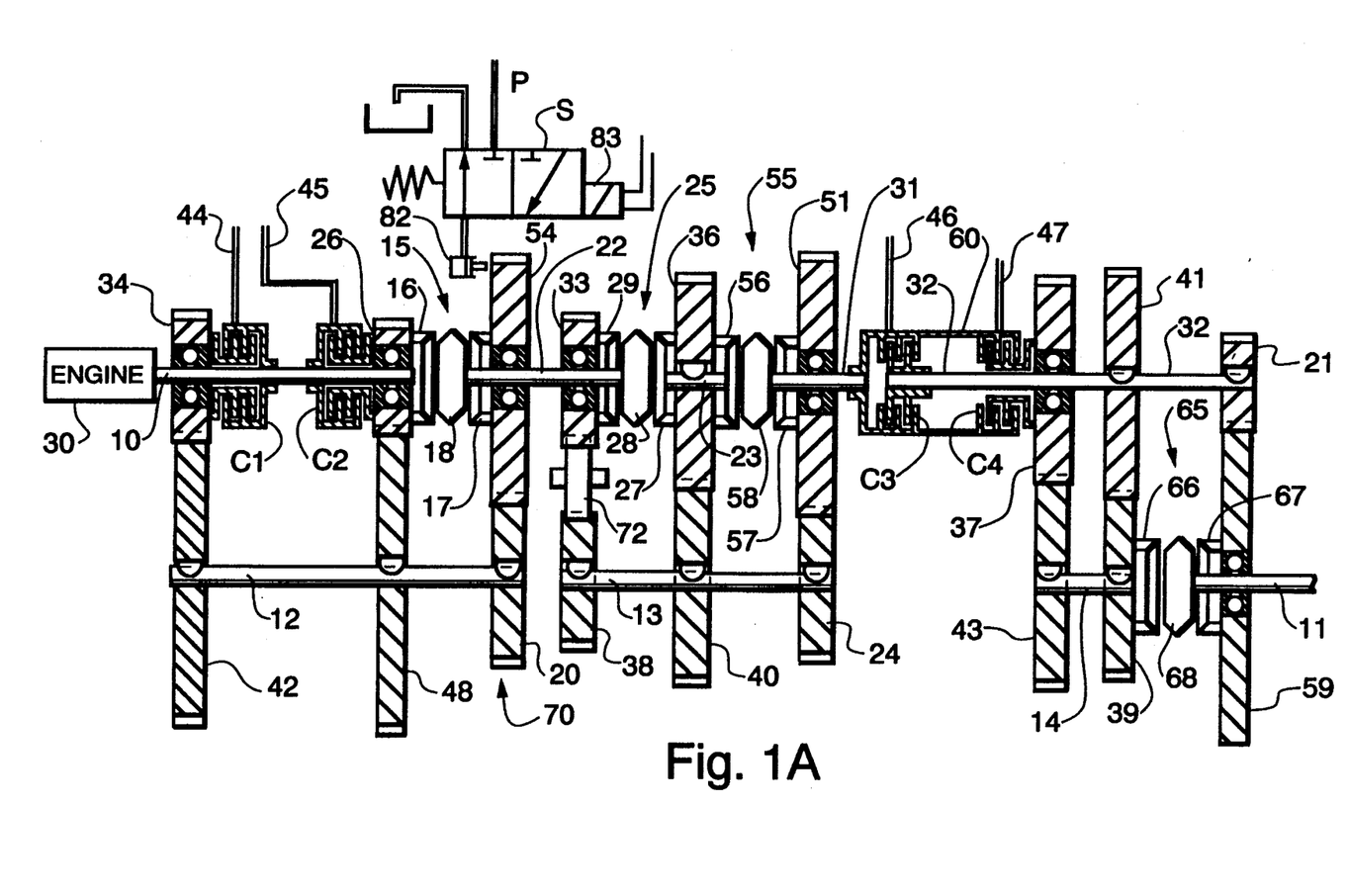
FIG. 1A shows a microprocessor-controlled powershift transmission with which the present invention may be utilized.

FIG. 1A illustrates a powershift transmission substantially as shown in U.S. Pat. No. 5,101,688 issued to Pearce et al. and reference may be made to that patent for a complete description. Briefly, the transmission includes an input shaft 10 driven by a tractor engine 30, an output shaft 11 for driving the tractor wheels, and two synchronized couplers 55, 65 and four electro-hydraulically actuated powershift clutches C1, C2, C3, C4 for selectively connecting the input shaft through gearing to the output shaft at any one of 16 forward input to output shaft speed ratios.

Figure 2:
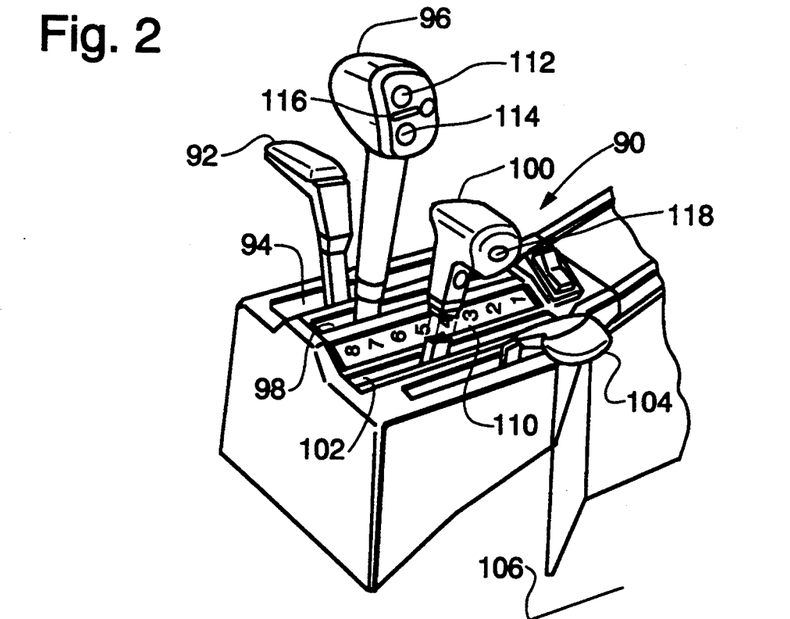
FIG. 2 shows the operator control levers for controlling the transmission.
Figure 3:
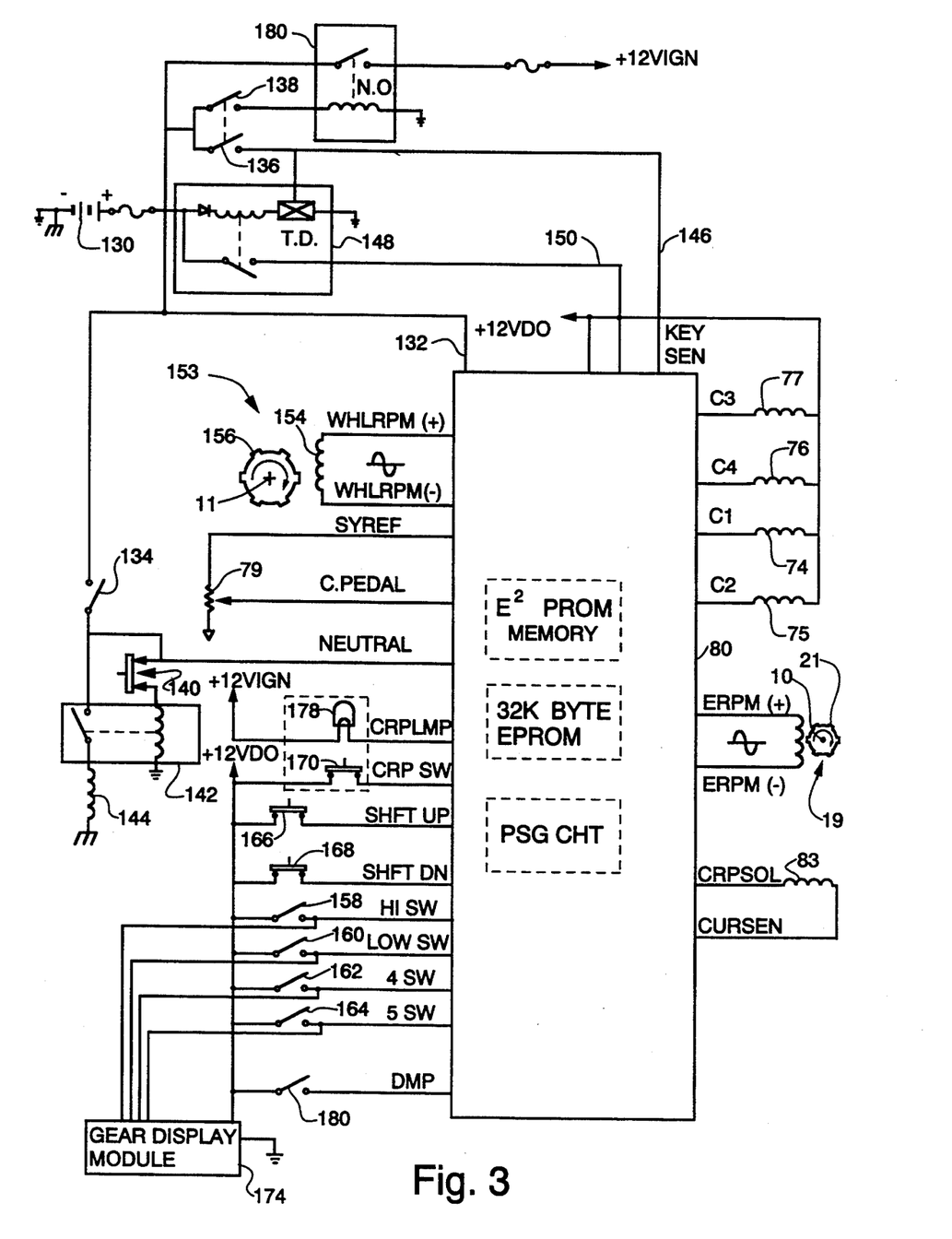
FIG. 3 is an electrical diagram illustrating the inputs to, and the outputs from, the transmission controller.

A high/low shift lever 92 (FIG. 2) is mechanically linked to coupler 65 while a 4/5 shift lever 96 is mechanically linked to coupler 55. By shifting lever 92 an operator may select a high or a low range of speed ratios, each range including eight ratios. By shifting lever 96 an operator may select a range which includes the lower four or the higher four ratios within the range selected by lever 92. A microprocessor based controller 80 (FIG. 3) stores a gear variable (PSG CNT) which is incremented or decremented in response to actuation of Up-shift and Down-shift push buttons 112, 114 provided on the shift lever 96. The count in the counter determines which one of the clutches C1, C2 and which one of the clutches C3, C4 is actuated to select one powershift speed ratio within the range of four ratios specified by the settings of shift levers 92 and 96.

A synchronized forward/reverse coupler 25 is mechanically linked to a forward/reverse lever 100 (FIG. 2) thus permitting output shaft 11 to be driven at one of sixteen forward or sixteen reverse speed ratios relative to input shaft 10. Lever 100 has a center "neutral" position and when the lever is in neutral a switch 140 (FIG. 3) is closed.

An optional coupler 15 provides an additional eight forward and eight reverse low or creeper speed ratios. The controller 80 responds to actuation of a creeper switch 170 (FIG. 3) to thereby energize the solenoid 83 of a valve S. When valve S is energized, hydraulic fluid under pressure is applied from a source P through the valve to actuate a piston 82. The piston acts to move power transfer member 18 into engagement with drive member 17.

Figure 1B:
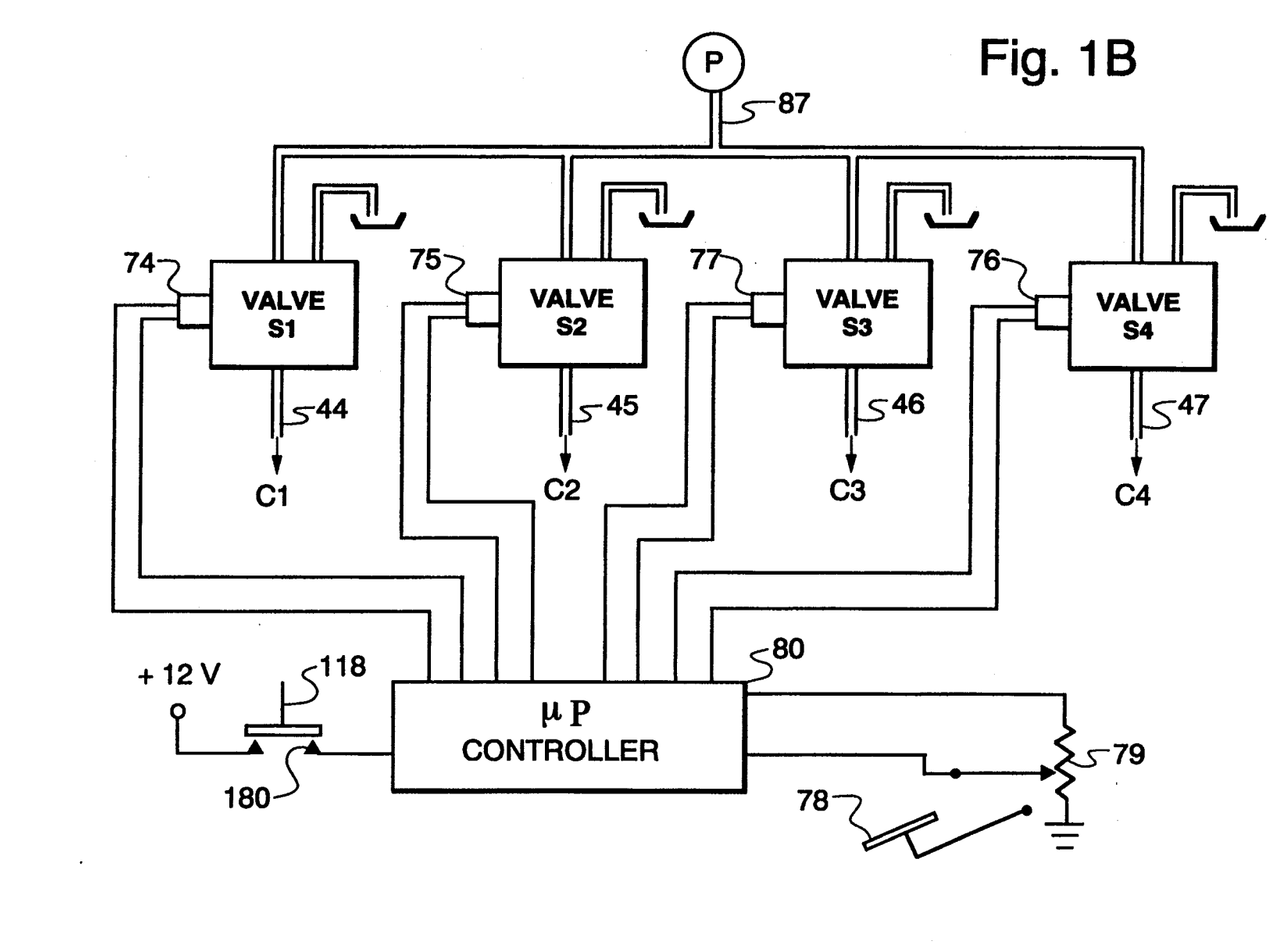
FIG. 1B shows the electro-hydraulic controls for the powershift clutches.

The currently preferred electro-hydraulic system for controlling powershift clutches differs from that shown in the Pearce et al. patent. The pressure applied to feathering clutches C3, C4 is no longer controlled by a valve mechanically linked to a clutch pedal and a dump valve is no longer utilized to "dump" the pressure to clutches C1–C4. As shown in FIG. 1B, the clutch pedal 78 controls a potentiometer 79 which is connected to controller 80 so that the controller receives an analog signal indicative of the pedal position. A source P of hydraulic fluid under pressure is connected via four valves S1–S4 and four flow lines 44–47 to the clutches C1–C4 respectively. The valves S1, S2, S3 and S4 are controlled by solenoids 74, 75, 77 and 76, respectively. The controller 80 produces pulse width modulated signals for energizing the solenoids. The valves S1–S4 modulate the flow of fluid from flow line 87 to the powershift clutches C1–C4. Modulation is effected by controlling in a known manner the duty cycle of the PWM signals applied to solenoids 74–77 by the controller. As the duty cycle of a signal applied to a solenoid increases, the flow of fluid through the associated valve is controlled to increases the pressure and torque transmitting capability of the associated clutch.

The controller 80 (FIG. 3) senses various switches associated with the manual shift levers 92, 96 and 100. These include a high switch 158 and a low switch 160 which are closed when the high/low shift lever 92 is positioned to select a high or a low range of speed ratios, a 4 switch 162 and a 5 switch 164 which are closed when the 4/5 shift lever 96 is positioned to select the lower or the higher range within the range selected by shift lever 92, and a switch 140 which is associated with the neutral position of the forward/reverse lever 100. Momentary switches 166 and 168 are actuated by the push-buttons 112, 114 on the shift lever 96 and in response to a switch closure the controller increments or decrements, respectively, the gear variable PSG CNT, unless a powershift is not possible because the top or bottom gear of a group of 4 powershift gears is already selected. The contents of PSG CNT indicate which powershift gear is active. As explained in the Pearce et al. patent, only one of the clutches C1, C2 and one of the clutches C3, C4 is active for any selected gear speed ratio. From the switches 140, 158, 160, 162 and 164 and the contents of PSG CNT, the controller may determine the selected gear speed ratio.

A ground speed sensor 153 comprises toothed gear 156 fixed on output shaft 11 and a reluctance sensor 154 which senses passage of the gear teeth and produces a sinusoidal output signal. The controller 80 measures the time between cycles of the output signal and filters the information in order to derive a value indicating tractor ground speed. Engine speed is determined in a similar manner using signals from the alternator 21.

A battery 130 is connected to three sets of ignition switch contacts 134, 136 and 138. The contacts 134 are closed only when the ignition switch is in the "crank" position. Contacts 136 and 138 are closed when the ignition switch is in the "run" position. Circuits energized when contacts 138 are closed are not relevant to the present invention. Contacts 136 provide a signal over lead 146 to inform the controller that the ignition switch is in the run position. Contacts 136 are also connected through clutch switch contacts 148 to a signal input of the controller. Contacts 148 are operated by the clutch pedal 78 (FIG. 2) and are opened when the clutch pedal is fully depressed.

When the ignition switch is in the crank position and the Forward/Reverse lever 100 is in the neutral position, a circuit is formed from battery 130 through ignition switch contacts 134 and neutral switch contacts 140 to energize a start relay 142. The relay contacts close so that the battery voltage is applied to the starter coil 144.

A lead 132 connects controller 80 directly to the tractor battery 130 so that power is always available to the controller. The controller includes a microprocessor such as a type 80C196 and additional ROM memory for permanently storing a computer program and tables of data.

According to one aspect of the present invention, a transmission system as described above is modified by providing a "dump" push button 118 (FIG. 2) on the Forward/Reverse lever 100, and a set of contacts 180 (FIG. 3) operated by the push button. Controller 80 senses the switch contacts 180 and when they are closed, the controller issues signals to the solenoids 74–77 to release the clutch pressure of powershift clutches C1–C4. This disconnects the transmission from input shaft 10 and also disconnects from the output shaft 11 that portion of the transmission drive chain which includes the synchronized forward/reverse coupler 25. With push button 118 still pressed, the operator may shift lever 100 from the forward to the reverse position, or from the reverse to the forward position without depressing clutch pedal 78. When the dump button 118 is released, the controller 80 controls solenoids 74 and 75 so that clutch pressure is re-established in powershift clutch C1 or C2, depending on the gear speed ratio specified by the value in PSG CNT. The controller also executes a program routine as subsequently described to feather or modulate the clutch pressure of powershift shift clutch C3 or C4 according to ground speed acceleration and other factors to provide a smooth acceleration of the tractor regardless of its weight and load.

Figure 5A:
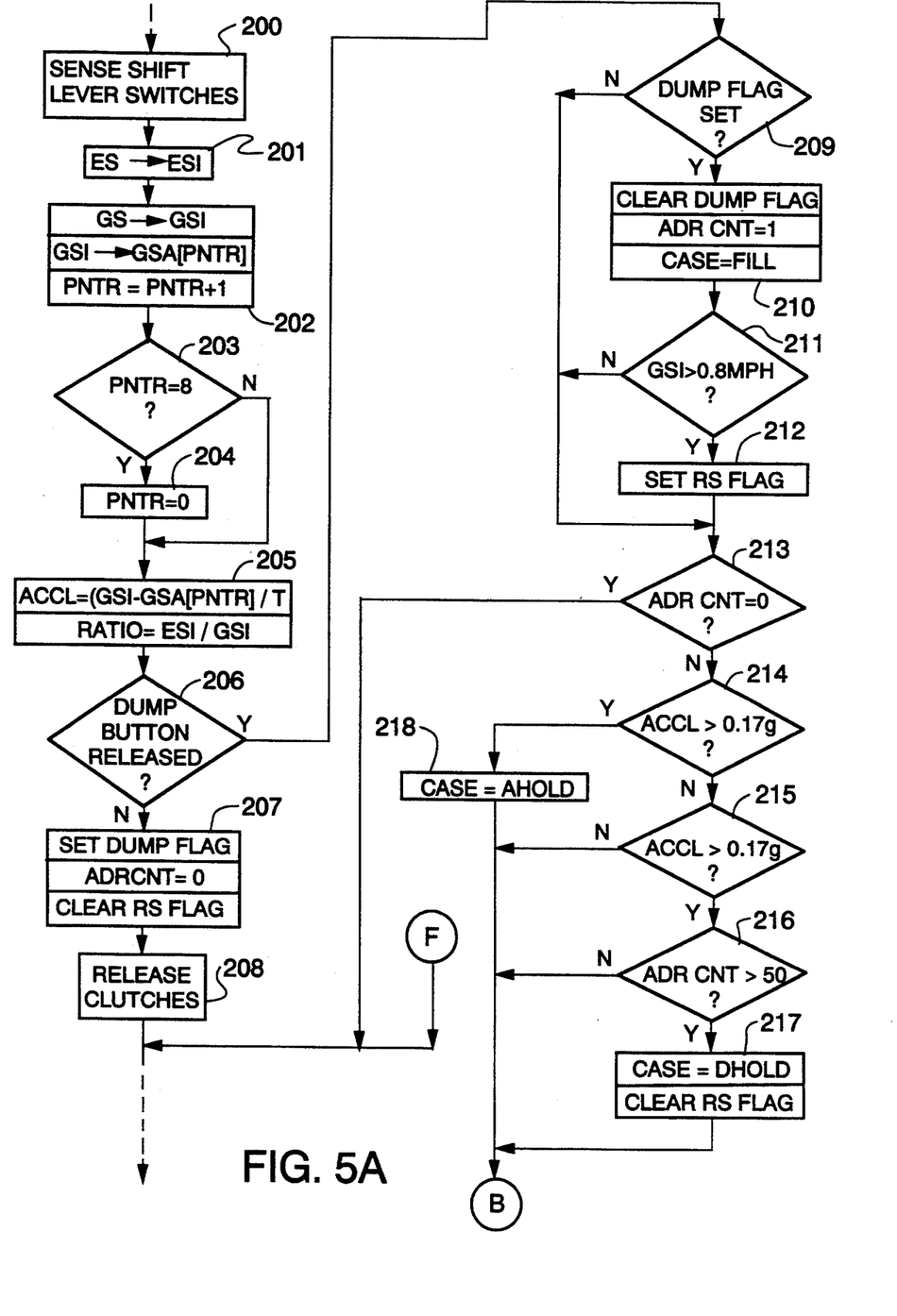
FIGS. 5A–5C comprise a flow diagram illustrating clutch pressure control strategy according to the present invention.
Figure 5B:
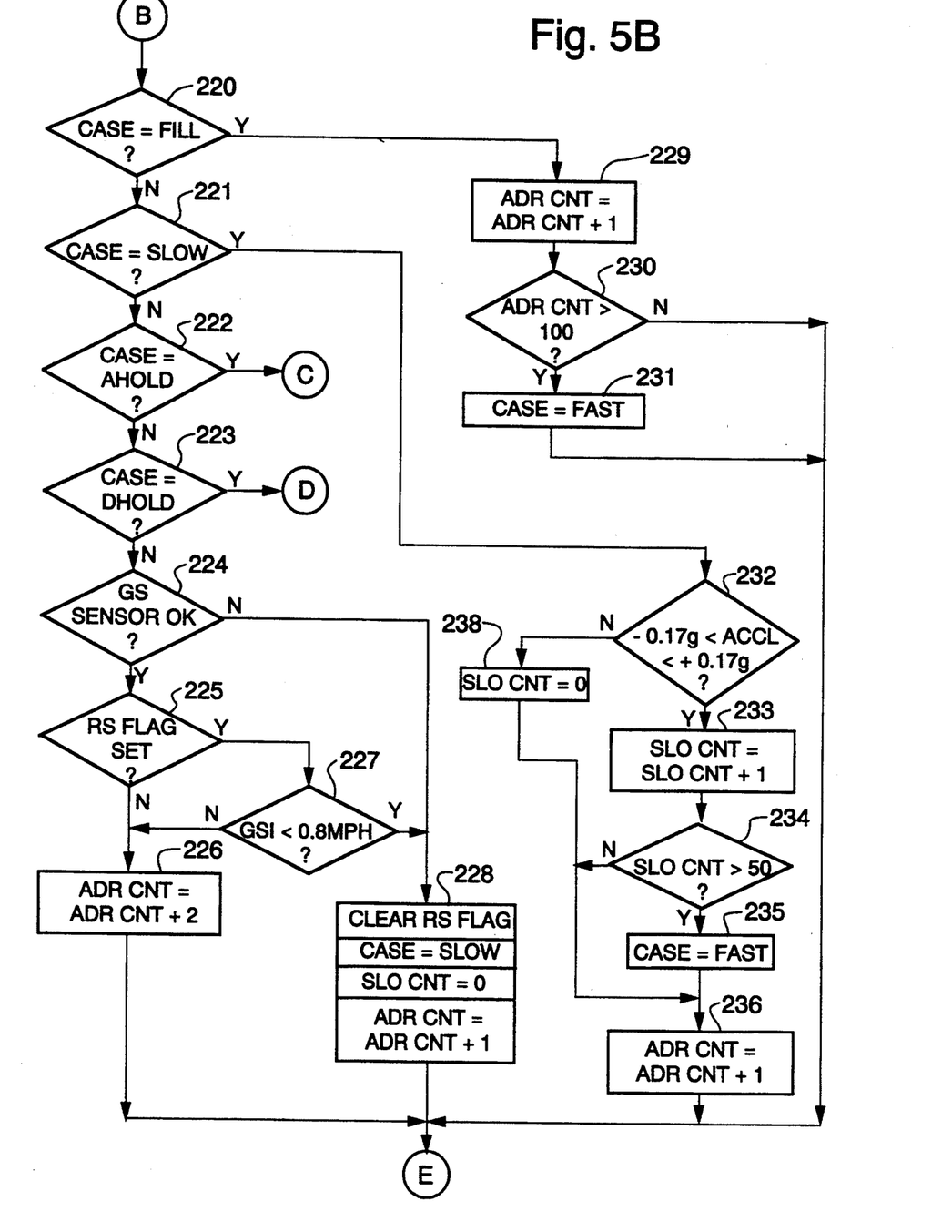
Figure 5C:
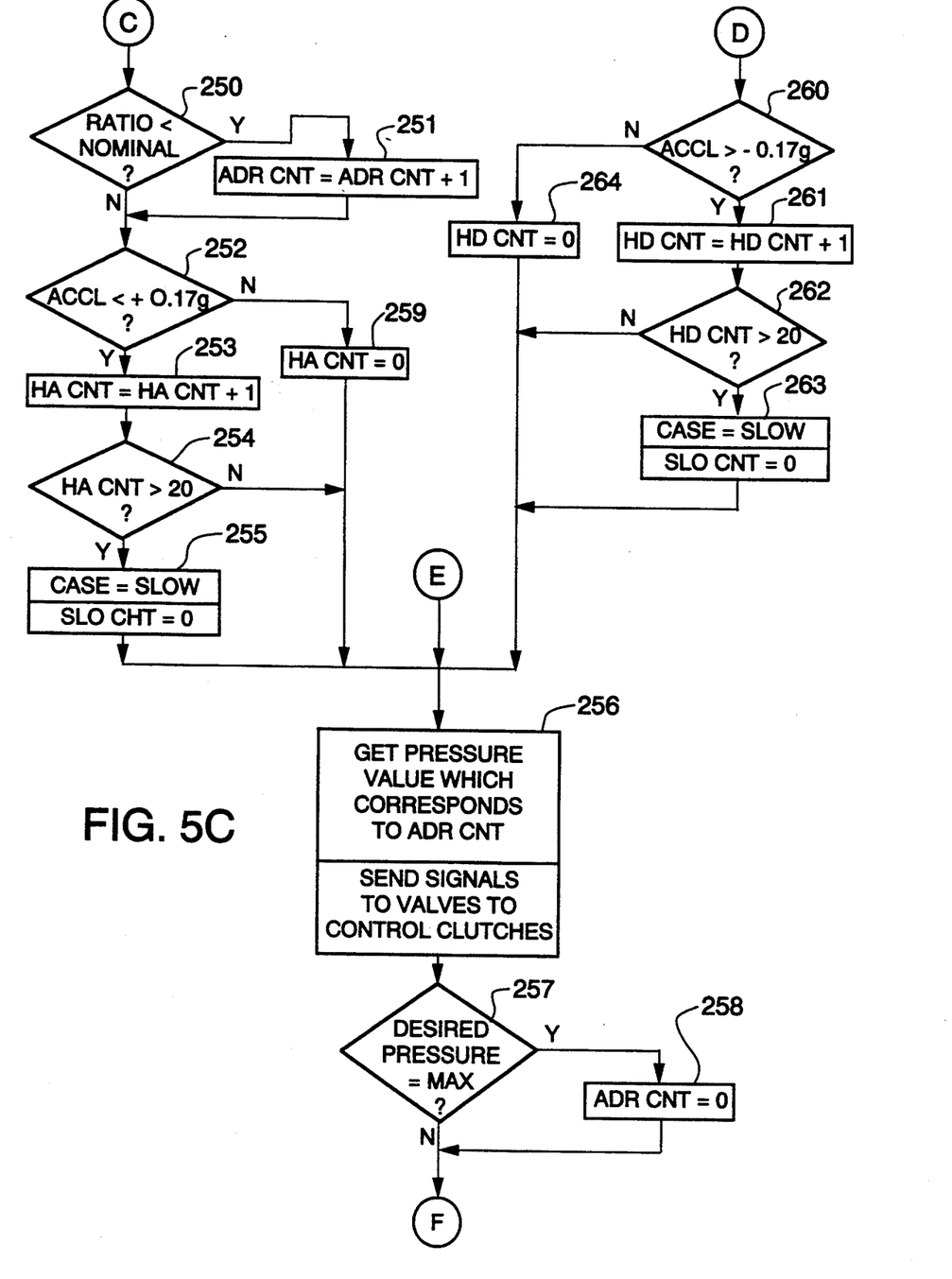

FIGS. 5A–5C illustrate a routine which may be executed by the controller 80 to provide smooth acceleration upon shifting from forward to reverse or reverse to forward using the dump push button 118. The routine is part of a main program loop repeatedly executed by the controller every 10 ms.

Figure 4:
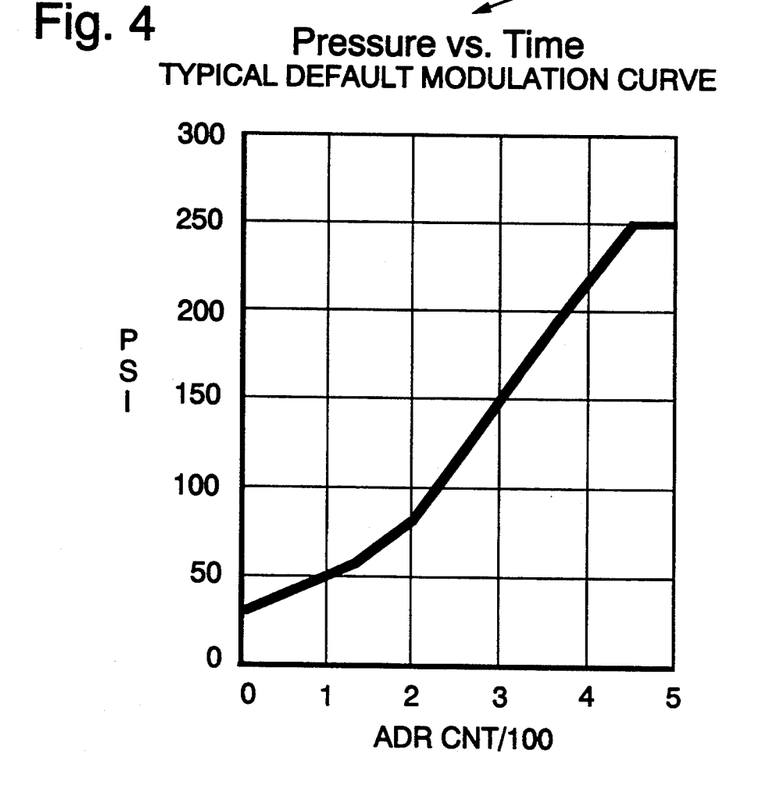
FIG. 4 shows a typical default modulation curve of pressure versus time.

Generally speaking, the purpose of the routine shown in FIGS. 5A–5C is to determine whether to add 0, 1 or 2 to a counter ADR CNT, which corresponds to first, second or third rate increase modes, as described in greater detail below. This counter is used to determine the desired clutch pressure by addressing a table of clutch pressure values stored in ROM. The table contains several data pairs of pressure and ADR CNT values, the pressure values being increasingly larger for larger ADR CNT values. FIG. 4 is a graphical representation of such a table, where the node points on the graph represent the data pairs. Interpolation is used to determine the desired clutch pressure corresponding to ADR CNT values between the nodes. The duty cycle of the PWM signal sent to solenoid 77 or 76 is controlled to obtain the desired pressure in powershift clutch C3 or C4. FIG. 4 illustrates the increase in clutch pressure with time when the counter is incremented by one each 10 ms.

Assume that the tractor is moving with the transmission in some selected gear speed ratio. Step 200 (FIG. 5A) is executed every 10 ms to determine which gear speed ratio is selected. Switches 158, 160, 162 and 164 are sensed to determine the positions of the range select levers 92 and 96 and the switches 166 and 168 are sensed to determine if the powershift gear variable PSG CNT is to be incremented or decremented.

At step 201 the controller saves at memory location ES1 the engine speed calculated from the time period between pulses received from the engine-driven alternator 21.

In like manner, the ground speed derived from the output shaft speed sensor 154 is calculated at step 202 and entered into a register GS1. The contents of GS1 are then saved in one address of an 8-element array. An address value PNTR determines the address into which the ground speed value is entered. After the value is entered into the array, PNTR is incremented so that on the next execution of the program the next ground speed value will be saved at the next location in the array.

After PNTR is incremented, it is tested (step 203) and if it has been incremented to 8 it is reset to zero (step 204) before advancing to step 205. If step 203 shows the PNTR is not equal to 8 then the program moves directly from step 203 to step 205.

At step 205, the vehicle acceleration is calculated by taking the difference between the current ground speed and a previous ground speed stored in the array, and dividing the difference by the time interval between the times the two speeds were sensed. Step 205 also causes the engine speed sensed at step 201 to be divided by the ground speed sensed at step 202, the result being saved at RATIO for later use when step 250 is executed.

At step 206 the controller senses the state of the dump button switch 180 to determine if the dump button 118 is depressed or released. Assume for the moment that the dump button is released. The program advances to step 209 where a DUMP flag is tested. This flag is set when the dump button is depressed so the test at step 209 proves false. The program advances to step 213 wherein ADR CNT is tested to determine if it is equal to zero. Under the assumed conditions ADR CNT will be zero so the controller advances to the step following step 208 to perform tests and control functions not related to the present invention.

The program including steps 200–206, 209 and 213 is repeated every 10 ms as long as the dump button 118 is not pressed. On each execution of the program the most recently sensed ground speed is saved in the array and every eighth time the program is executed PNTR is reset.

Assume now that the operator wishes to perform a shuttle shift or start the tractor from rest. He depresses the dump button 118 and shifts lever 100 between the forward and reverse positions. When the dump button is depressed the state of the dump button switch 180 is sensed the next time step 206 is executed and the program advances to step 207 where the DUMP flag is set, ADR CNT is cleared and an RS flag is set. At step 208 signals are sent to the clutch valve solenoids 74–77 (FIG. 1B) to actuate valves S1–S4 and release the pressure in clutches C1–C4.

After step 208 is executed the program continues as previously described with steps 200–208 being executed each time the program is executed. This continues until the operator releases the dump button 118.

When the dump button is released, the condition of the dump button switch when step 206 is next executed causes the program to advance to step 209. Since the DUMP flag was set at step 207 while the dump button was depressed, the test at step 209 proves true. At step 210 the DUMP flag is cleared, ADR CNT is set to 1 and a code "FILL" is stored in location CASE. The content of CASE is tested as subsequently described to determine whether 0, 1 or 2 should be added to ADR CNT.

At step 211 the current ground speed GS1 is tested to determine if it is greater than 0.8 mph. If the current speed is not greater than 0.8 mph the program advances directly to step 213 but if the speed is greater than 0.8 mph the RS flag is set at step 212 before the program advances to step 213.

Step 213 tests ADR CNT for zero. The test proves false since ADR CNT was set to 1 at step 210. The acceleration calculated at step 205 is tested at step 214 and if it is greater than +0.17 g, as might be the case if the vehicle is moving down grade, the code "AHOLD" is entered into CASE at step 218 before the program advances to step 220 in FIG. 5B.

If the acceleration is not greater than +0.17 g, the acceleration is tested at step 215 to determine if the deceleration (negative acceleration) is greater than 0.17 g and if it is not the controller advances from step 215 to step 220.

If the test at step 215 shows that the negative acceleration is greater than 0.17 g, the count in ADR CNT is tested at step 216 to determine if it contains a count greater than 50. If the count is less than 50, the program advances to step 220, but if the count is not less than 50 step 217 is executed to load the code "DHOLD" into CASE and clear the RS flag.

At steps 220-223 the program successively checks the contents of the register CASE to determine what code is stored in the register. Step 220 checks for the code "FILL", step 222 checks for the code "AHOLD" and step 223 checks for the code "DHOLD". Step 221 checks for the code "SLOW" which is entered into the register as subsequently described. If CASE holds none of these codes then it must hold the code "FAST" which is entered therein as described below.

Assume that CASE holds the code "FILL" when step 220 is executed. The program branches to step 229 where ADR CNT is incremented. ADR CNT is then tested at step 230 and if it contains a count no greater than 100 the program moves to step 256 (FIG. 5C). If ADR CNT contains a count greater than 100 then the code "FAST" is loaded into CASE at step 231 before the program advances to step 256.

At step 256 the controller uses the count in ADR CNT to address memory and read from a table of pressure values the pressure value which corresponds to the count. The pressure value read from the memory is then used to generate a signal for controlling the solenoid 76 or 77 of the powershift clutch valve C3 or C4 depending on which gear was selected at the time step 200 was executed. At the same time, other clutches are actuated or controlled depending on the selected gear.

After the control signals are sent to the clutches, step 257 is executed to determine if the count in ADR CNT corresponds to the last pressure value in the table of pressure values, that is, if the pressure value specified by ADR CNT is equal to the maximum pressure value. If not, the program moves to point F (FIG. 5A) and continues with other functions not related to the present invention. If step 257 shows that ADR CNT corresponds to the last pressure value in the table, ADR CNT is reset to zero (step 258) before the program advances to point F.

In FIG. 5B, if CASE does not hold the code "FILL", then at step 221 CASE is tested to see if it holds the code "SLOW". If it does, step 232 tests the acceleration value computed at step 205 to see if it represents a positive acceleration no greater than 0.17 g or a negative acceleration (deceleration) no greater than 0.17 g. If the acceleration ACCL is outside the range −0.17 g to +0.17 g a timer SLO CNT is cleared at step 238.

The purpose of SLO CNT is to time the interval since ACCL last exceeded an acceleration of +0.17 g or a deceleration of −0.17 g. When one of the limits is exceeded, SLO CNT is reset at step 238. On succeeding executions of the program, if CASE=SLOW at step 221 SLO CNT is either again reset at step 238 if a limit is exceeded or incremented at step 233 if ACCL is within the limits. After SLO CNT is incremented, it is tested at step 234. If SLO CNT is no greater than 50 (i.e. less than 0.5 sec), ADR CNT is incremented at step 236. If SLO CNT is greater than 50, the code "FAST" is entered into case before ADR CNT is incremented.

After ADR is incremented at step 236 the program jumps to step 256 (FIG. 5C) where the incremented value in ADR CNT is used to obtain a pressure value from memory, the pressure value then being used to modulate clutch pressure as previously described.

In FIG. 5B, if the program reaches step 222 and CASE holds the value "AHOLD", a jump is made to step 250 (FIG. 5C). The controller memory holds a table of values, each value representing the nominal ratio of engine speed to ground speed for each possible gear ratio. At step 250, the selected gear ratio sensed at step 200 is used to access the table and obtain the nominal ES/GS ratio for the presently selected gear. This nominal ratio is then compared with the actual or measured ratio computed and stored in RATIO at step 205. If the actual ratio is less than the nominal ratio, which may be the case if the vehicle is moving on a down grade so that the ground speed increases, ADR CNT is incremented at step 251 before the program advances to step 252. Increasing ADR CNT causes the clutch pressure to increase so that the transmission and engine act as a brake to slow the vehicle movement.

If step 250 determines that the actual engine speed/ground speed ratio is no greater than the nominal ratio, the program advances to step 252 without incremented ADR CNT.

The purpose of steps 252-255 and 259 is to keep track of the interval of time since the acceleration last exceeded +0.17 g and, if more than 0.2 sec elapses without the acceleration exceeding the limit, enter the code "SLOW" into CASE. ACCL is tested at step 252 and if it is less than +0.17 g a counter HA CNT is reset at step 259 before the program advances to step 256.

If ACCL is less than +0.17 g, HA CNT is incremented at step 253 and tested at step 254. If HA CNT contains a count less than 20 the program advances to step 256 and proceeds as previously described. Assuming conditions do not change, after 0.2 sec HA CNT will be incremented so that it contains a value greater than 20. When this occurs "SLOW" is entered into CASE at step 255 and SLO CNT is reset before the program advances to step 256.

In FIG. 5B, if the program reaches step 223 and CASE holds the value DHOLD, a jump is made to step 260 (FIG. 5C). The purpose of steps 260-264 is to keep track of the interval of time since the acceleration last exceeded the limit of −0.17 g and, if more than 0.2 sec elapses without the limit being exceeded, enter the code "SLOW" into CASE and reset SLO CNT. A counter HD CNT times the interval. Steps 260-264 perform the same operations as steps 252-255 and 259 and need not be described further.

After steps 263 or 264 is executed the program advances to step 256 to address and obtain from memory a pressure value for controlling the feathering clutch. From FIGS. 5B and 5C it is evident that when CASE=DHOLD, ADR CNT is not increased hence the clutch pressure is maintained at a constant value. Furthermore, if CASE=AHOLD the clutch pressure remains constant as long as the actual or measured engine speed to ground speed ratio is no greater than the nominal ratio for the presently selected gear.

In FIG. 5B, if the register CASE holds the code "FAST" then the tests at steps 220-223 will all prove false. The ground speed sensor is then tested at step 224 to determine if it is in working order, that is, if there are no shorts or open leads. If the sensor is not operable, step 228 clear the RS Flag, loads the code "SLOW" into CASE, resets the timer SLO CNT and increments ADR CNT on each execution of the program. The clutch pressure is thus increased in the default mode as represented by the curve of FIG. 4.

If the test at step 224 shows that the ground speed sensor is working, the RS flag is tested at step 225. If RS flag is not set, either as a result of not being set at step 212 because the ground speed was not greater than 0.8 mph at the time the dump button was released, or because it was reset at step 217 as a result of the acceleration being greater than −0.17 g more than 0.5 sec after the dump button was released, ADR CNT is incremented by two at step 226 and the incremented value is used at step 256 to obtain the clutch pressure value from the table of pressure values.

When the test at step 225 shows that the RS flag is set, the current ground speed is tested at step 227 and if the current ground speed is not less than 0.8 mph ADR CNT is incremented by two at step 226 and the incremented value used to obtain the clutch pressure value. However, if the current ground speed is less than 0.8 mph the program branches to step 228 to clear the RS flag, set CASE="SLOW", reset SLO CNT and increment ADR CNT by one, the incremented value in ADR CNT then being used at step 256 to obtain from memory the clutch pressure value used to control the feathering clutch pressure. Since CASE is set to "SLOW" at step 228, this will be detected at step 221 on the succeeding loop through the program. Steps 232–236 will then control the incrementing of ADR CNT by one on each loop through the program. This will continue for up to 0.5 sec unless the acceleration exceeds +0.17 g or the deceleration exceeds −0.17 g.

If the operator shifts from forward to reverse and releases the dump button while the tractor is still moving forward, or shifts from reverse to forward and releases the dump button while the tractor is still moving backward, the ground speed will go through zero and there is a period during which ground speed cannot be measured. The ground speed sensor 154 will not respond at speeds near zero. To assure reliable speed measurements, any measured speed below 0.8 mph is treated as 0.8 mph. This results in zero acceleration being calculated when the ground speed is below 0.8 mph. If clutch pressure were almost, but not quite, high enough to cause 0.17 g deceleration when the speed drops to 0.8 mph, and ADR CNT were increased by 2, excessive jerk and acceleration could occur before the ground speed passed through zero and the acceleration could again be calculated. On the other hand, if ADR CNT is not incremented to cause an increase in clutch pressure when the ground speed drops below 0.8 mph, the tractor may stop, and remain stopped, under some conditions. It is for this reason that ADR CNT is incremented by 1 for up to 0.5 sec. This is sufficient time to pass from 0.8 mph in one direction to 0.8 mph in the other direction if acceleration is near 0.17 g.

Generally speaking, the routine shown in FIGS. 5A–5C controls the application of pressure to one of the feathering clutches C3, C4 according to one of the following modes.

1. CASE="FILL". The program is initially active in this mode providing the acceleration does not exceed +0.17 g. ADR CNT is incremented by one (step 230) each 10 ms. If the acceleration exceeds +0.17 the program changes to the AHOLD mode (step 230). If, more than 0.5 sec after the dump button is released the acceleration exceeds −0.17 the program changes to the DHOLD mode (step 217). A change is made to the FAST mode if the acceleration/deceleration does not exceed +0.17 g or −0.17 g for one second.

2. CASE="AHOLD". This mode is entered when the acceleration exceeds +0.17 g. ADR CNT is incremented by one (step 251) only if the calculated ratio of engine speed to ground speed is less than the nominal ratio for the presently selected gear. If the acceleration drops below 0.17 g and remains there for more than 0.2 sec a change is made to the "SLOW" mode.

3. CASE="DHOLD". This mode is entered when the acceleration is less than −0.17 g if more than 0.5 sec has elapsed since the dump button was released. ADR CNT is not incremented in the DHOLD mode. If the acceleration becomes greater than −0.17 g and remains there for more than 0.2 sec a change is made to the "SLOW" mode.

4. CASE="SLOW". ADR CNT is incremented by one (step 236) during each loop through the-program when the SLOW mode is in effect. A change is made to the FAST mode if the acceleration/deceleration does not exceed +0.17 g or −0.17 g for 0.5 sec.

5. CASE 32 "FAST", bad GS sensor. In this mode ADR CNT is incremented by one just one time (step 228). A change is then made to the SLOW mode.

6. CASE="FAST", RS FLAG SET. This mode is entered only if the ground speed was greater than 0.8 mph at the time the dump button was released, and has dropped below 0.8 mph. The mode is active for only one loop through the program and when active causes ADR CNT to be incremented by one (step 228). A change is made to the SLOW mode.

7. CASE="FAST". In this mode ADR CNT is incremented by two (step 226) on each loop through the program. From the FAST mode the program may change to the AHOLD or DHOLD mode if the acceleration should exceed +0.17 g or the deceleration should exceed −0.17 g.

The following example illustrates acceleration control resulting from a typical shuttle shift. It is assumed that there is low rolling resistance (hard ground), fairly level ground, no tractor load and the operator is not using the brakes. The tractor is moving in one direction, the operator has depressed the dump button, moved the forward/reverse lever to select the opposite direction, and has just released the dump button. For up to 1.0 sec mode "FILL" controls and ADR CNT is increased by 1 every 10 ms. Before 1 second has elapsed, the deceleration reaches 0.17 g. Mode DHOLD then controls and ADR CNT is not changed as the tractor slows down.

Mode DHOLD controls until 0.2 sec after the ground speed drops below 0.8 mph. When the ground speed drops below 0.8 mph the calculated acceleration goes to zero because of the use of 0.8 mph as the minimum ground speed used for calculations.

Mode SLOW then controls incrementing of ADR CNT by 1 until the calculated acceleration exceeds +0.17 g. Acceleration requires a somewhat higher pressure than deceleration due to rolling resistance. When the calculated acceleration reaches +0.17 g, mode AHOLD controls until the clutch locks up. ADR CNT is not incremented.

After the clutch locks up, the acceleration drops below +0.17 g for more than 0.2 sec so control passes to mode SLOW for 0.5 sec during which time ADR CNT is incremented by 1 each 10 ms. At the end of 0.5 sec control passes to mode FAST which increments ADR CNT by 2 until the end of the pressure value table is reached, that is, until the count in ADR CNT reaches a value corresponding to the last address in the table of pressure values.

The automatic control according to acceleration is always terminated when the test at step 257 (FIG. 5C) shows that the pressure value addressed by ADR CNT is the last or highest pressure value in the table of pressure values. When the test at step 257 proves true, ADR CNT is reset to zero at step 258. The next time the program reaches step 206 the program will advance to step 209, assuming the Dump button is still released. Since the Dump flag is reset, the program branches to step 213. The test at step 213 proves true because ADR CNT has been reset. Therefore, the routine for controlling clutch pressure according to acceleration is bypassed. The program moves directly to other control functions not relevant to the present invention. One of these control functions is control of clutch pressure in accordance with the position of the clutch pedal.

The present invention is not limited in use to shuttle shifting. It may also be used to start a tractor from rest and provide smooth acceleration without having to use a clutch pedal. If the forward/reverse lever is in neutral, the operator depresses the dump button 118, shifts the lever to the forward or reverse position, and releases the dump button. The acceleration routine of FIGS. 5A-5C is then executed as previously described to provide smooth acceleration of the tractor regardless of load.

For example, when starting from rest with an implement in the ground, the acceleration routine will typically operate as follows. Mode FILL will control acceleration during the first 1.0 sec by incrementing ADR CNT by 1 each cycle. After 1 second mode FAST controls and ADR CNT is incremented by 2. This continues until the full clutch pressure is reached. The acceleration never reaches +0.17 g.

When starting from rest with no load, mode FILL controls during the first 1.0 sec and ADR CNT is incremented by 1. With no load this will cause the acceleration to exceed +0.17 g before the end of one second and control passes to mode AHOLD and ADR CNT is not incremented until the clutch (C3 or C4) locks up. After the clutch locks up the acceleration drops below +0.17 g for more than 2 sec so control passes to mode SLOW and for the next 0.5 sec ADR CNT is incremented by one. Control then passes to mode FAST and ADR CNT is incremented by two until the end of the pressure value table is reached and full clutch pressure is applied. Since the clutch is not slipping, this rapid pressure increase is transparent to the operator.

The control algorithm of the present invention is not limited to use with a shift lever mounted dump switch nor to the specific transmission described above to illustrate the principles of the invention. The control algorithm may be used with full powershift transmissions, that is, transmissions having no forward/reverse coupler. It may also be used to control synchronized shuttle transmissions having no powershift clutches.

The function of the dump switch may be performed by other means such as a switch mechanism operated by a shift lever having forward, neutral, and reverse positions, such that the switch controls dumping of the clutch pressure when the lever is moved to the neutral position. The dump swich could also be actuated through a foot-operated pedal. Other modifications may be made in the described preferred embodiment without departing from the spirit and scope of the invention as defined by the appended claims.

We claim:

1. A method of controlling acceleration of a vehicle during shuttle shifting or starts from rest, the vehicle having an engine for driving an input shaft of a transmission, the transmission having an output shaft providing torque for moving the vehicle over the ground and a feathering clutch for transferring torque from said input shaft to said output shaft, said method comprising the steps of:
    (a) releasing clutch pressure in said feathering clutch so that it transfers no torque from said input shaft to said output shaft;
    (b) terminating the release of clutch pressure in said leathering clutch;
    (c) after the release of feathering clutch pressure has been terminated, measuring the acceleration of the vehicle; and,
    (d) controlling the clutch pressure in said feathering clutch in accordance with the acceleration.

2. A method as claimed in claim 1 wherein the step of measuring the acceleration comprises measuring the ground speed of the vehicle and calculating the acceleration from the measured ground speed.

3. A method as claimed in claim 1 wherein the step of controlling the clutch pressure comprises increasing the clutch pressure at a first, second or third rate increase mode.

4. A method as claimed in claim 3 wherein said first rate increase mode effects a zero increase.

5. A method as claimed in claim 1 wherein steps (c) and (d) are repeatedly performed until the clutch pressure in said feathering clutch reaches a maximum value for transferring torque from said input shaft to said output shaft.

6. A method as claimed in claim 5 wherein step (d) comprises periodically increasing the clutch pressure by a first, second or third amount, said method further comprising the step of comparing the measured acceleration with positive and negative acceleration limit values, the clutch pressure being increased by said first amount when the acceleration exceeds either of said limits and for a predetermined time after either of said limits is exceeded.

7. A method as claimed in claim 6 wherein said first amount is zero.

8. A method as claimed in claim 6 wherein step (d) comprises increasing the clutch pressure by said second amount when the acceleration does not exceed and has not exceeded either of said limits for said predetermined time, and a second predetermined time has elapsed since termination of the release of clutch pressure, and increasing the clutch pressure by said third amount when the acceleration does not exceed and has not exceed either of said limits for said predetermined time and said second predetermined time has not elapsed since termination of the release of clutch pressure.

9. Apparatus for controlling acceleration of a vehicle during shuttle shifting or starts from rest, the vehicle having an engine for an input shaft of a transmission, the transmission having an output shaft providing torque for moving the vehicle over the ground and a feathering clutch for transferring torque from said input shaft to said output shaft, said apparatus comprising:
    first means changeable between a first state in which clutch pressure in said feathering is released so that it transfers no torque from said input shaft to said output shaft and a second state in which the release of said clutch pressure is terminated;
    second means for measuring the acceleration of said vehicle; and,
    third means responsive to said first and second means for controlling increases in the clutch pressure in said feathering clutch when said first means is changed from said first state to said second state.

10. Apparatus as claimed in claim 9 wherein said third means includes a memory for storing a table of clutch pressure values, an address counter for addressing said memory to read therefrom one of said clutch pressure values, means responsive to said second means for incrementing said address counter at periodic intervals in accordance with the acceleration of said vehicle; and means for applying to said feathering clutch a clutch pressure determined by the clutch pressure value read from said memory.

11. Apparatus as claimed in claim 10 wherein said means for incrementing said address counter comprises means for adding 0, 1 or 2 to said address counter.

12. A transmission system having a forward/reverse coupler, a plurality of electro-hydraulic powershift clutches for selectively connecting an input shaft through gearing and said coupler to an output shaft, and a forward/reverse shift lever mechanically linked to the forward/reverse coupler, said transmission system further comprising:
 a dump switch;
 a dump button located on said forward/reverse shift lever for actuating said dump switch when said dump button is depressed; and,
 a controller responsive to actuation of said dump switch for disengaging said powershift clutches to disconnect said input and output shafts from the coupler.

13. A transmission system as claimed in claim 12 wherein said output shaft is connected to drive wheels of a tractor, said transmission system further comprising:
 a speed sensor for sensing the ground speed of the tractor;
 said controller including means responsive to said speed sensor for determining the acceleration of said tractor, and means for applying a signal to one of said powershift clutches to vary the clutch pressure of said one powershift clutch when said dump button is released, said signal having a magnitude which varies dependent on the acceleration of said tractor and the elapsed time since the dump button was released.

14. In a transmission system for a tractor driven by an engine, said transmission system having a forward/reverse coupler mechanically connected to a forward/reverse lever, at least one further coupler mechanically connected to a range shift lever, a plurality of electro-hydraulic powershift clutches, an input shaft selectively connectable through said couplers and said clutches at any one of a plurality of gear speed ratios, the forward/reverse coupler being driven from said input shaft through a first of said powershift clutches and the output shaft being driven by the forward/reverse coupler through a second of the powershift clutches, a first speed sensor for sensing engine speed, and a second speed sensor for sensing the ground speed of the tractor, the improvement comprising:
 a manually actuated dump switch;
 a controller responsive to actuation of said dump switch for controlling the powershift clutches to release clutch pressure therein to thereby disconnect said input and output shafts from the forward/reverse coupler,
 said controller including calculating means responsive to the second speed sensor for calculating the acceleration of the tractor and acceleration control means responsive to said first and second speed sensors, said calculating means and said dump switch for controlling pressure in the second powershift clutch when said dump switch is released.

15. The improvement as claimed in claim 14 wherein said acceleration control means includes a memory for storing a table of values representing powershift clutch pressures, the values stored at progressively higher addresses of said table representing progressively higher clutch pressures, a counter for periodically addressing the memory to read one of said values from said table to control the pressure in the second powershift clutch, and counter incrementing means responsive to said calculating means, said first and second speed sensors and said dump switch for periodically incrementing said counter by 0, 1 or 2 from the time said dump switch is released until said counter contains a count corresponding to the address of the value in said table representing a maximum clutch pressure.

16. The improvement as claimed in claim 15 wherein said counter is incremented and said memory is addressed periodically about every 10 ms.

17. The improvement as claimed in claim 15 and further comprising a failure sensing means for sensing a failure of said second speed sensor means, said counter incrementing means being responsive to the failure sensing means for always incrementing said counter by 1.

* * * * *